Sept. 5, 1950 F. S. SEFCOVIC 2,521,417
BEAN HARVESTER
Filed July 10, 1946 2 Sheets-Sheet 1
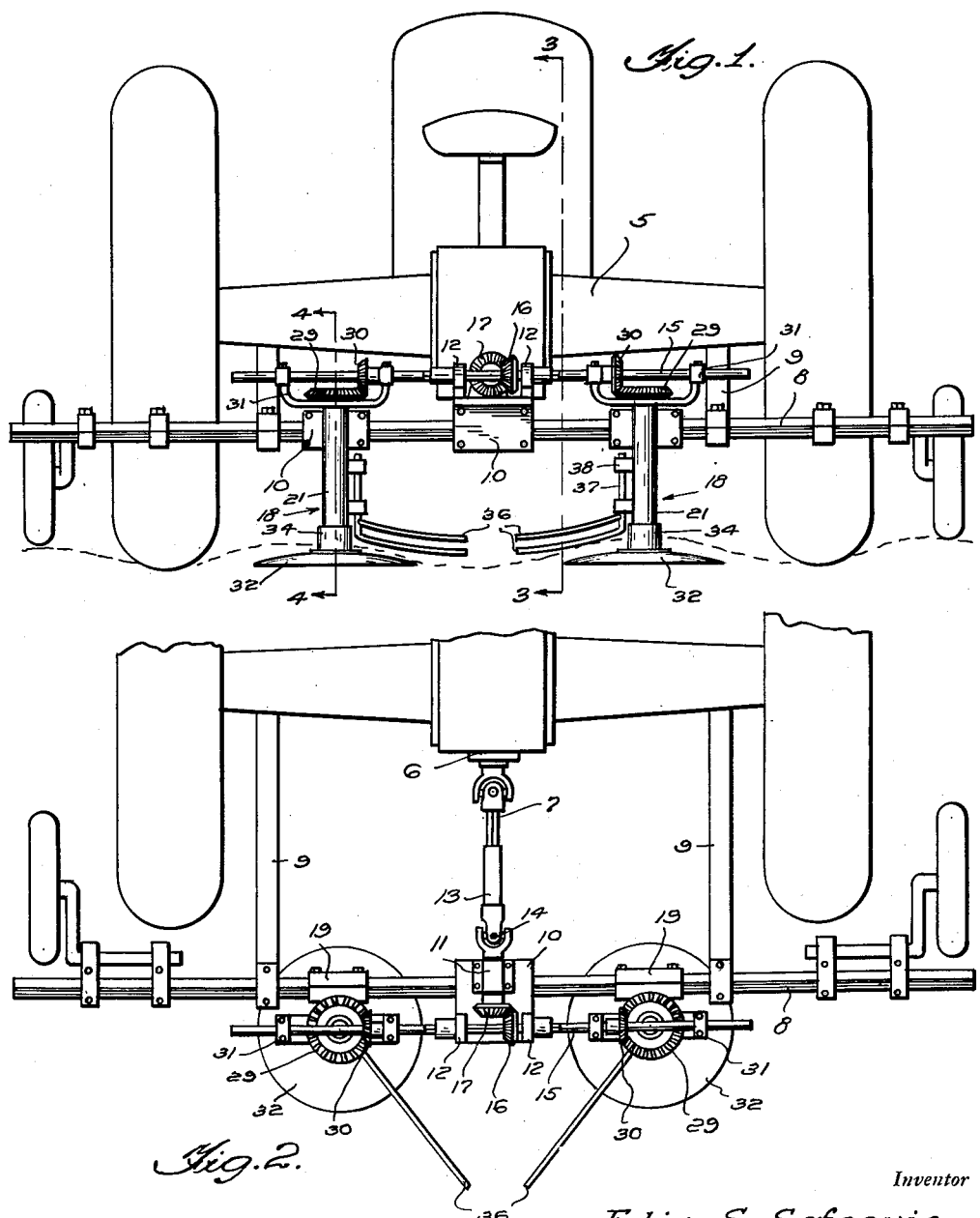
Inventor
*Felix S. Sefcovic,*
By *Clarence A. O'Brien
and Harvey B. Jacobson*
Attorneys Sept. 5, 1950 F. S. SEFCOVIC 2,521,417
BEAN HARVESTER
Filed July 10, 1946 2 Sheets-Sheet 2
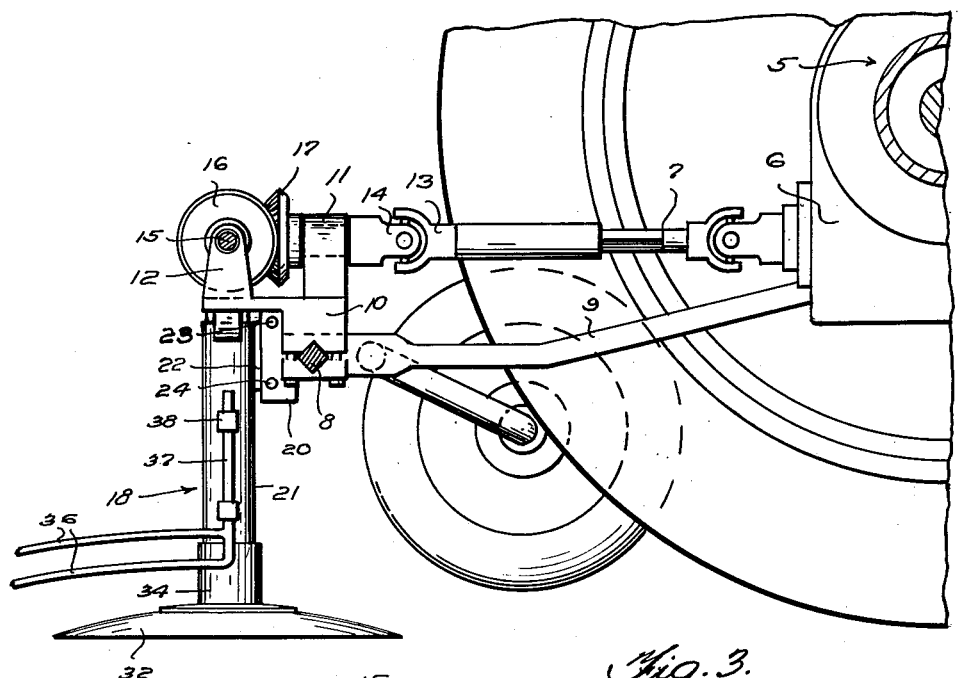
Fig. 3.
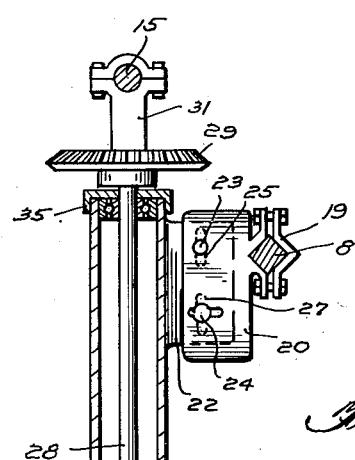
Fig. 4.
Inventor
Felix S. Sefcovic,
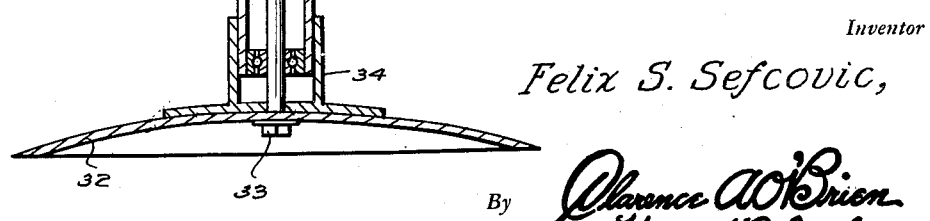
Attorneys Patented Sept. 5, 1950

2,521,417

UNITED STATES PATENT OFFICE 2,521,417

BEAN HARVESTER

Felix S. Sefcovic, Pueblo, Colo.

Application July 10, 1946, Serial No. 682,721

4 Claims. (Cl. 55—62)

The present invention relates to new and useful improvements in bean harvesters and more particularly to a power operated rotary cutting disc adapted to cut or sever the stalks of the beans below the surface of the ground.

An important object of the present invention is to provide a cutting unit adapted for removably attaching to the tool bar of a tractor and providing an operating connection for the cutter with the power take-off of the tractor.

Another object of the invention is to provide a bean harvester whereby any desired number of the cutting units may be mounted in operative position on the tool bar of conventional construction usually provided on a farm tractor and wherein the cutting units may be easily and quickly removed from the tool bar when not in use, so that the same will not interfere with the interchangeable use of other types of units provided for attaching to the tool bar.

A further object of the invention is to provide a cutting unit of this character embodying means for vertically adjusting the same on the tool bar as well as for adjusting the pitch of the cutting disc.

Another object is to provide an attachment of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a rear elevational view.

Figure 2 is a top plan view.

Figure 3 is an enlarged sectional view taken on a line 3—3 of Figure 1, and

Figure 4 is an enlarged vertical sectional view of one of the cutting units taken on a line 4—4 of Figure 1.

Referring now to the drawings in detail wherein for the purpose of illustration I have disclosed a preferred embodiment of the invention the numeral 5 designates a conventional type of farm tractor which includes a power take-off unit 6 for driving a rearwardly projecting shaft 7. The tractor further includes a tool bar 8 which extends transversely at the rear of the tractor and supported on brackets 9.

A bracket 10 is clamped to the tool bar 8 having journals 11 and 12 arising therefrom, the journal 11 rotatably supporting a jack-shaft 13 telescopically engaging the shaft 7 and including a universal joint 14.

A transversely extending shaft 15 is journalled in the bearing 12 and to which a bevel gear 16 is secured in driving engagement with a similar gear 17 secured to the rear end of the jack shaft 13.

One or more cutter units designated generally at 18 are secured to the shaft 15, each cutter unit including a clamp 19 secured to the tool bar 8 and having a vertical plate 20 carried thereby.

A tubular shaft housing 21 is secured in a vertical position by means of a plate 22 projecting from the upper portion thereof and positioned at one side of the plate 20. The plate 22 is provided with upper and lower bolts 23 and 24 threaded therein, the upper bolt being adjustable in an upper vertical slot 25 formed in the plate 20 and the lower bolt 24 being adjustable in a vertical slot 26 and in a horizontal slot 27 arranged in crossed intersecting relation with respect to each other in the lower portion of the plate 20. Accordingly, the housing 21 may be adjusted vertically on the plate 20 and may also be secured in an inclined position by adjusting the bolt 24 in the horizontal slot 27.

A shaft 28 is journalled in the housing 21 with a ring gear 29 secured to its upper end engaging a pinion 30 keyed to the shaft 15.

The outer ends of the shaft 15 are journalled in yokes 31 carried at the upper end of each unit 18.

An inverted concaved cutting disc 32 is secured to the lower end of the shaft 28 by means of a nut 33 threaded on the shaft, the disc having a hub 34 rising from its upper surface for sleeving over the lower end of the housing 21 to close the lower end of the housing and to prevent dirt from entering the same. The upper end of the housing is closed by a cap 35 and the housing may be packed with a suitable quantity of grease to lubricate the shaft 28.

A plurality of rods 36 are formed with upstanding inner ends 37 secured in sockets 38 at one side of the housing 21, the rods extending rearwardly from the cutting unit as shown in Figure 2 of the drawings to form more compact windrows of the cut vine.

From the foregoing it will be apparent that any of the desired number of the cutting units 18 may be supported on the tool bar 8 of the tractor and driven from the power take-off of the tractor through the shaft 15. The cutting units may be removed from the tractor when other types of implements or tools are mounted on the tool bar.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim as my invention:

1. In a tractor of the type including a power take-off and a transverse tool bar, a bean harvester adapted for mounting as a unitary structure on said tool bar, said bean harvester comprising a rotary cutter unit including a vertical shaft and a housing therefor, a vertical plate carried by the housing and a vertical plate carried by the tool bar, said plates being positioned side by side, pin and slot connecting means between the plates and arranged for vertically and tiltably adjusting the shaft housing on the bar, and means operatively connecting the cutter unit to the power take-off.

2. In a tractor of the type including a power take-off and a transverse tool bar, a bean harvester adapted for mounting as a unitary structure on said tool bar, said bean harvester comprising a rotary cutter unit including a vertical shaft and a housing therefor, a vertical plate carried by the housing, a second vertical plate adjustably clamped to the tool bar, said plates being positioned side by side, pin and slot connecting means between the plates and arranged for vertically and tiltably adjusting the shaft housing on the bar, and means operatively connecting the cutter unit to the power take-off.

3. In a tractor of the type including a power take-off and a transverse tool bar, a bean harvester adapted for mounting as a unitary structure on said tool bar, said bean harvester comprising a rotary cutter unit including a vertical shaft and a housing therefor, a vertical plate carried by the housing, a second vertical plate adjustably clamped to the tool bar, said plates being positioned side by side, pin and slot connecting means between the plates and arranged for vertically and tiltably adjusting the shaft housing on the bar, and means operatively connecting the cutter unit to the power take-off, said means comprising a bearing bracket secured to the tool bar, and a transverse shaft journaled on the bracket driven by the power take-off and in driving engagement with said vertical shaft.

4. In a tractor of the type including a power take-off and a transverse tool bar, a bean harvester adapted for mounting as a unitary structure on said tool bar, said bean harvester comprising a rotary cutter unit including a vertical shaft and a housing therefor, a vertical plate carried by the housing, a second vertical plate adjustably clamped to the tool bar, said plates being positioned side by side, pin and slot connecting means between the plates and arranged for vertically and tiltably adjusting the shaft housing on the bar, and means operatively connecting the cutter unit to the power take-off, said means comprising a bearing bracket carried by the tool bar, a bearing bracket supported on the vertical shaft housing, and a transverse shaft journaled in said brackets driven by the power take-off and in driving engagement with said vertical shaft.

FELIX S. SEFCOVIC.

REFERENCES CITED

The following references are of record in the file of this patent:

UNITED STATES PATENTS

| Number | Name | Date |
|---|---|---|
| 702,513 | Welsh | June 17, 1902 |
| 1,629,678 | Burrow | May 24, 1927 |
| 2,088,141 | Royston | July 27, 1937 |
| 2,193,157 | Ayo | Mar. 12, 1940 |
| 2,344,663 | Wood | Mar. 21, 1944 |

FOREIGN PATENTS

| Number | Country | Date |
|---|---|---|
| 1,333 | Great Britain | 1868 |
| 37,306 | Germany | Oct. 21, 1886 |